United States Patent [19]

Iijima

[11] Patent Number: 4,647,069
[45] Date of Patent: Mar. 3, 1987

[54] AUTOMOTIVE SUSPENSION SYSTEM WITH VEHICLE HEIGHT CONTROL

[75] Inventor: Yoshitaka Iijima, Atsugi, Japan

[73] Assignee: Nissan Motor Company, Limited, Japan

[21] Appl. No.: 573,504

[22] Filed: Jan. 24, 1984

[30] Foreign Application Priority Data

Jan. 24, 1983 [JP] Japan .................................. 58-9672

[51] Int. Cl.⁴ .......................................... B60G 11/26
[52] U.S. Cl. .................................. 280/707; 188/299; 280/DIG. 1
[58] Field of Search ................. 280/707, 714, DIG. 1; 188/285, 299, 319

[56] References Cited

U.S. PATENT DOCUMENTS

| 3,246,905 | 4/1966 | Morgan | 280/6 R |
| 3,827,538 | 8/1974 | Morgan | 188/319 |
| 4,313,529 | 2/1982 | Koto et al. | 280/714 |
| 4,327,936 | 5/1982 | Sekiguchi | 280/711 |
| 4,463,839 | 8/1984 | Ashiba | 188/319 |
| 4,468,739 | 8/1984 | Woods et al. | 280/707 |

FOREIGN PATENT DOCUMENTS

| 54-102470 | 11/1979 | Japan . | |
| 56-82616 | 7/1981 | Japan . | |
| 57-118907 | 7/1982 | Japan . | |
| 57-205208 | 12/1982 | Japan . | |
| 57-534 | 4/1983 | Japan | 188/299 |
| 58-71210 | 4/1983 | Japan . | |
| 128912 | 8/1983 | Japan | 280/DIG. 1 |
| 2036246 | 6/1980 | United Kingdom . | |
| 2119473 | 11/1983 | United Kingdom . | |

OTHER PUBLICATIONS

European Search Report, EP 84 10 0729.

Primary Examiner—John J. Love
Assistant Examiner—Ross Weaver
Attorney, Agent, or Firm—Leydig, Voit & Mayer

[57] ABSTRACT

An automotive suspension system includes a height control system for controlling vehicle height and a damping force adjusting system for adjusting damping force produced by a shock absorber. The height control system and the damping force adjusting system are coordinated such that the damping force is decreased when the height control system shifts the vehicle body upwards, and the damping force is increased when the height control system shifts the vehicle body downwards. Furthermore, the height control system is responsive to the height of the vehicle body and the vehicle speed to shift the vehicle body up and down so that the vehicle body is held to within a predetermined range of height.

13 Claims, 11 Drawing Figures

AUTOMOTIVE SUSPENSION SYSTEM WITH VEHICLE HEIGHT CONTROL

BACKGROUND OF THE INVENTION

The present invention relates generally to an automotive suspension system for suspending road wheels from a vehicle body, which suspension system includes a vehicle height control mechanism and a damping force adjusting mechanism. More particularly, the invention relates to a suspension system for an automotive vehicle with a vehicle height control mechanism associated with a damping force adjusting mechanism for varying the damping force produced by vehicle dampers in correspondence with the height of the vehicle body with respect to the road surface.

Vehicle height adjusting mechanisms or vehicle level regulators are known in various guises. For example, U.S. Pat. No. 4,327,936, issued on May 4, 1982 to Sekiguchi, discloses a height control system for an automotive vehicle with an air dehumidifying arrangement. The disclosed system includes a vehicle height detector for detecting variations in the height of the vehicle body and a pneumatically controlled damper for raising and lowering the vehicle in correspondance with the detected vehicle level. For instance, when the detector detects that the vehicle is lower than a predetermined lower limit, the detector produces a signal demanding increase in the pressure in the damper to raise the vehicle body, and when the detector detects that the vehicle is higher than a predetermined upper limit, then the detector produces a down command to reduce the pressure in the damper and thus lower the vehicle. Thus the disclosed height control system can maintain the vehicle height or level to within a predetermined height range defined by the aforementioned lower and upper limits.

In general, such height control systems are used to regulate the vehicle level when significantly heavy loads are applied to the vehicle, which might otherwise excessively lower the vehicle. However, in recent years, height control systems have also been used to improve aerodynamics and driving stability. For the latter purpose, the recently developed height control systems are equipped with a vehicle speed-dependent height-adjusting mechanism. This vehicle speed-dependent height adjustment means that the vehicle is lowered by a predetermined amount when the vehicle is travelling at a speed above a given speed, e.g., 80 km/h.

Dampers applicable for vehicle height control have pneumatic chambers the pressure within which can be adjusted in the manner set forth above in order to adjust the vehicle height. As the pressure in the pneumatic chamber increases, the damper becomes more rigid. This may cause a rough-ride feeling for the vehicle occupants. On the other hand, as the pressure in the pneumatic chamber decreases, the damping force generated by the damper also decreases, thus degrading driving stability. In particular, if the vehicle level is reduced while the vehicle is moving at a speed higher than the above given speed, driving stability would be significantly degraded due to insufficient damping force and increased tendency toward roll steering. In order to achieve driving stability and a greater cornering force restricting roll steering, the damper or suspension coils may be selected to produce a greater damping force. However, in this case, when the vehicle height is adjusted upwards, the damping force may be so great as to provide a rough ride.

SUMMARY OF THE INVENTION

Therefore, it is an object of the present invention to provide an automtive suspension system with a vehicle height control system which cooperates with adjustment of damping force created by a suspension damper such that the damper can be adjusted to produce a smaller damping force when the vehicle height is adjusted upward and to a produce a larger damping force when the vehicle height is adjusted downwards.

In order to accomplish the above-mentioned and other objects, an automotive suspension system, according to the present invention, includes a height control system for controlling a vehicle height and a damping force adjusting system for adjusting damping force produced by a shock absorber. The height control system and the damping force adjusting system are mutually related so that damping force is adjusted to be decreased while the height control system is in operation to move a vehicle body upwardly, and damping force is adjusted to be increased while the height control system is in operation to move the vehicle body downwardly. Further, the height control system is responsive to height condition of the vehicle body and the vehicle speed to move the vehicle body up and down so that the vehicle body is maintained at a predetermined level.

According to one aspect of the invention, an automotive suspension system including a vehicle height control, comprises a suspension strut suspending a suspension member from a vehicle body including a shock absorber producing a damping force in response to bounding and rebounding motion of a vehicle body, a vehicle height sensor detecting up and down of the vehicle body to produce a height indicative signal having a value detected height condition of the vehicle body, a damping force adjusting mechanism incorporated in the shock absorber for adjusting magnitude of damping force by adjusting path area in a flow restriction orifice in the shock absorber, the damping force adjusting mechanism including an electrically operated actuator for varying the path area, a vehicle height adjusting mechanism associated with the shock absorber for adjusting a height adjusting force applied to the shock absorber, which force is effective between the vehicle body and the suspension member in a direction away from each other, and a controller associated with the damping force adjusting mechanism and the vehicle height control mechanism for feeding control signals thereto, the controller being responsive to the height indicative signal to increase the height adjusting force applied between the vehicle body and the suspension member when the value of the height indicative signal value is smaller than a given threshold, responsive to increasing of the height adjusting force to operate the damping force adjusting mechanism to increase the path area and thereby reducing damping force, and being responsive to the height indicative signal having a value greater than a given threshold to decrease the height adjusting force and responsive to decreasing of the height adjusting force to reduce the path area to increase the damping force to be produced.

BRIEF DESCRIPTION OF THE DRAWINGS

The present invention will be understood from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
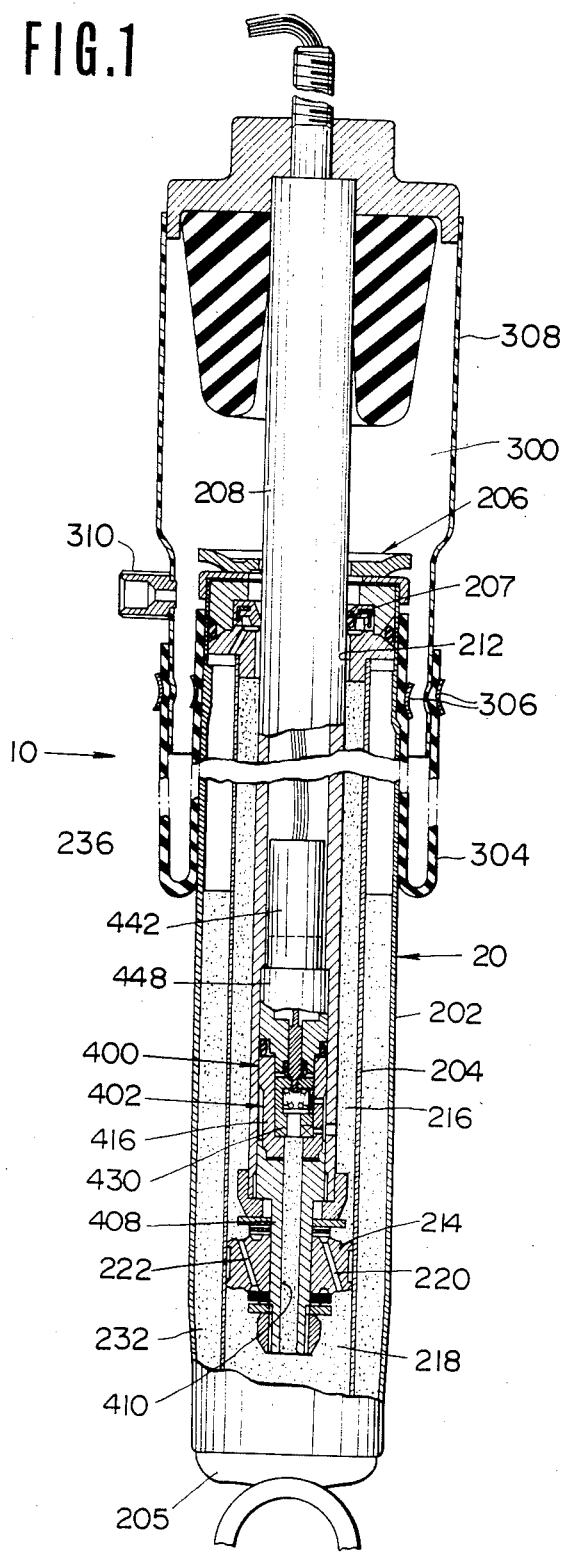
FIG. 1 is a cross section of a suspension strut to which the preferred embodiment of a vehicle height control mechanism associated with a damping force adjusting mechanism according to the present invention is applied.

Referring now to the drawings, particularly to FIG. 1, a suspension strut 10 applicable to the preferred embodiment of a suspension system according to the present invention includes a hydraulic damper or shock absorber 20 which generates an adjustable damping force. A pneumatic chamber 300 connected to a pressure source 302 in a height control system via an air tank 303 is defined above the hydraulic shock absorber 20. The pressure within the pneumatic chamber 300 can be adjusted by introducing air from the pressure source or venting air from the pneumatic chamber depending upon the vehicle height detected and/or vehicle parameters such as vehicle speed.

The hydraulic damper 20 has coaxial inner and outer cylinders 202 and 204. Top and bottom ends of the cylinders 202 and 204 are plugged with fittings 206 and 205. The fitting 206 includes a seal 207 which establishes a liquid-tight seal. A piston rod 208 extends through an opening 212 formed in the fitting 206 and is rigidly connected to a vehicle body (not shown) at its top end. The piston rod 210 is, in turn, connected to a piston 214 reciprocally housed within the inner cylinder 202 and defining upper and lower fluid chambers 216 and 218 therein.

Figure 2:
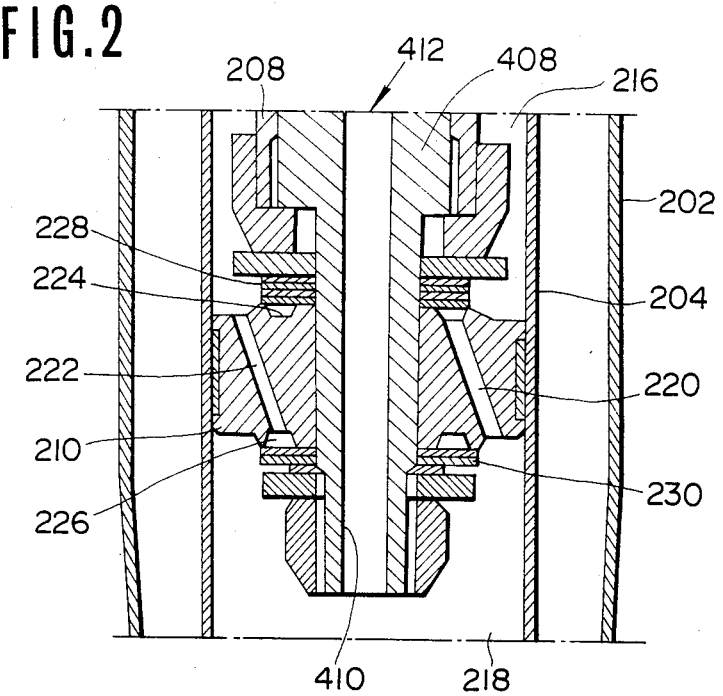
FIG. 2 is an enlarged section of a piston in a shock absorber in the suspension strut of FIG. 1.

As shown in FIG. 2, the piston 210 is formed with fluid passages 220 and 222 connecting the upper and lower fluid chambers 216 and 218. The piston 210 also has annular grooves 224 and 226 along its upper and lower surfaces concentric with circumferential edges thereof. The upper end the fluid passage 220 opens into the groove 224. On the other hand, the lower end of the fluid passage 222 opens into the groove 226. Upper and lower check valves 228 and 230 are provided opposite the grooves 224 and 226 respectively to close the grooves when in their closed positions. The lower end of the fluid passage 220 opens onto the lower surface of the piston at a point outside of the check valve 230. Likewise the upper end of the fluid passage 222 opens onto the upper surface of the piston at a point outside of the check valve 228.

Therefore, the fluid passage 222 is active during the piston expansion stroke, i.e. during rebound of the shock absorber. At this time, the check valve 228 prevents fluid flow through the fluid passage 220. On the other hand, during the piston compression stroke, i.e. during bounding movement of the suspension, the fluid passage 220 is active, allowing fluid flow from the lower fluid chamber 218 to the upper fluid chamber 216 and the fluid passage 222 is blocked by the check valve 230.

The piston rod 208 has a hollow cylindrical shape so that a damping force adjusting mechanism, which will be referred to generally by the reference numeral "400" hereafter, can be housed therein. The damping force adjusting mechanism 400 includes a valve member 402 for adjusting the cross-sectional area through which the working fluid can flow between the upper and lower chambers. In the preferred embodiment, the valve member 402 allows three steps of variation of the damping force, i.e., HARD mode, INTERMEDIATE or MEDIUM mode and SOFT mode, the narrowest cross-sectional area representing the HARD mode, the widest the SOFT mode and intermediate the INTERMEDIATE mode. Although the preferred embodiment of the invention will be described hereafter in terms of a three-way-adjustable damping force shock absorber, the number of adjustable positions of the shock absorber may be increased or decreased as desired and is not limited to the specific embodiment.

Figure 3:
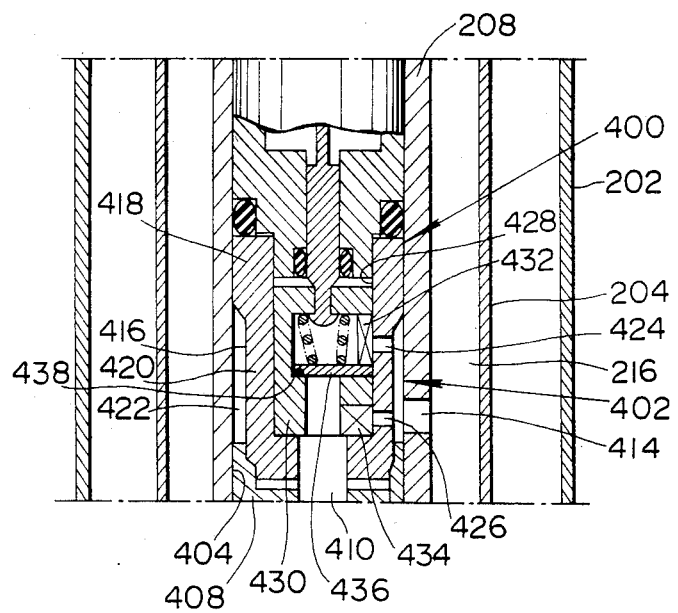
FIG. 3 is an enlarged section of the damping force adjusting mechanism in the suspension strut of FIG. 1.

FIG. 3 shows the details of the damping force adjusting mechanism and FIGS. 4a, 4b, 5a and 5b show part of the damping force adjusting mechanism in each the HARD, INTERMEDIATE, and SOFT modes. As shown in FIG. 3, the piston rod 208 defines an axially extending through opening 404 with the lower end opening into the lower fluid chamber 406. A fitting 408 seals the lower end of the opening 404 of the piston rod and has axially extending through opening 410, the axis of which is parallel to the axis of the through opening 404 of the piston rod. Thus, the through openings 404 and 410 constitute a fluid path 412 extending through the piston rod. The piston rod 208 also has one or more radially extending orifices or openings 414 opening into the upper fluid chamber 216. Thus, the upper and lower fluid chambers 216 and 218 are in communication through the fluid path 412 and the radial orifices 414.

A stationary valve member 416 with a flaring upper end 418 is inserted into the through opening 404 of the piston rod. The outer periphery of the flaring end 418 of the stationary valve member 416 is in sealing contact with the internal periphery of the through opening. The stationary valve member 416 has a portion 420 with a smaller diameter than that of the upper end 418 and so as to define an annular chamber 422 in conjunction with the inner periphery of the through opening 404 of the piston rod. The stationary valve member 416 has two sets of radially extending orifices 424 and 426 and an internal space 428. The radially extending orifices 424 and 426 establish communication between the internal space 428 and the annular chamber 422. A movable or rotary valve member 430 is disposed within the internal space 428 of the stationary valve member 416. The outer periphery of the rotary valve member 430 slidingly and sealingly contacts the inner surface of the stationary valve member 416 to establish a liquid-tight seal therebetween. Radially extending orifices 432 and 434 are defined in the rotary valve member 430 at positions opposite the orifices 424 and 426 of the stationary valve member 416.

Figure 5:
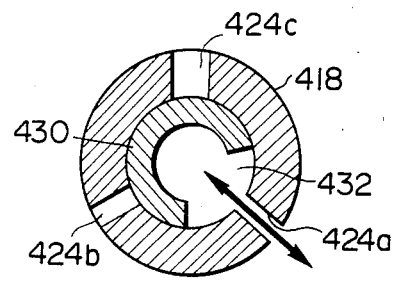
FIGS. 5a and 5b are cross-sections along lines A—A and B—B of FIG. 4 respectively.
Figure 5:
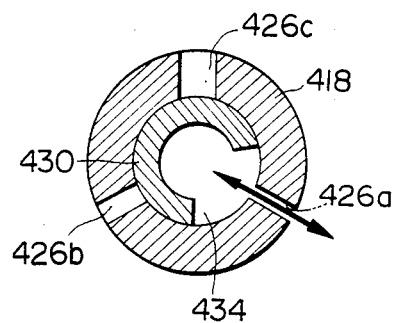

As shown in FIG. 5, the orifices 424 and 426 respectively include first, second and third orifices 424a, 424b, 424c, and 426a, 426b, and 426c. The first orifices 424a and 426a have the narrowest cross-sections and the orifices 432 and 434 are adapted to be in alignment with the first orifices to establish fluid communication between the upper and lower fluid chambers 216 and 218 in the case of the HARD mode. The third orifices 424c and 426c have the widest cross-sections and the orifices 432 and 434 are adapted to be in alignment with the third orifices in the case of the SOFT mode. The cross-sections of the second orifices 424b and 426c are intermediate those of the first and third orifices and the orifices 432 and 434 are adapted to align therewith in the case of the INTERMEDIATE mode.

A check valve 436 is provided within an internal space of the rotary valve member 430. The check valve 436 is normally biased towards a valve seat 438 by means of a bias spring 440 for allowing one-way fluid flow from the lower fluid chamber to the upper fluid chamber. This cause the bound damping force to be somewhat weaker than the rebound damping force.

Figure 6:
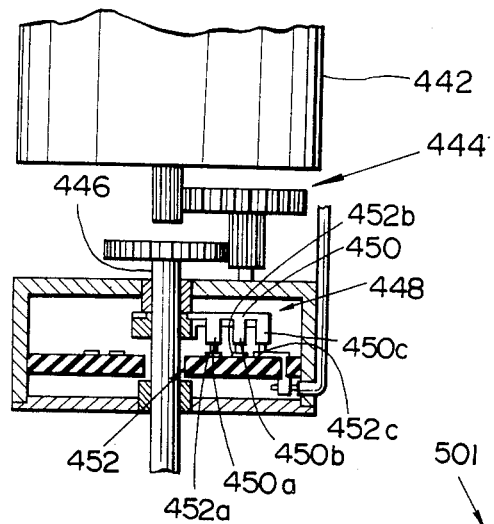
FIG. 6 is an enlarged section of a step motor associated with a potentiometer in the damping force adjusting mechanism of FIG. 3.
Figure 7:
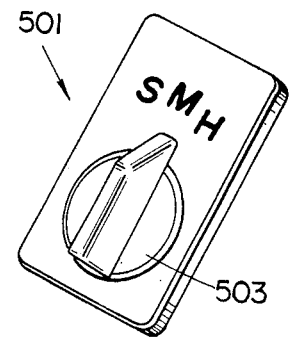
FIG. 7 is an enlarged plan view of the potentiometer of FIG. 6.

The rotary valve member 430 is associated with an electrically operable actuator such as an electrical step motor 442 through a differential gear unit 444 and an output shaft 446. A potentiometer 448 is associated with the output shaft 446, as shown in FIGS. 6 and 7. The potentiometer 448 includes a movable contact 450 with contactors 450a, 450b and 450c. The contactors 450a, 450b and 450c are adpated to slidingly contact stationary contact elements 452a, 452b and 452c of a stationary contact 452. According to the electrical connections between the movable contact and the stationary contact, the potentiometer 448 produces a mode signal representative of the rotary valve position and thus indicative of the selected mode of the damping force adjusting mechanism. The step per motor 442 is electrically connected to a controller 500 to receive a mode selector signal which drive the motor 442 through an angle corresponding to the rotary valve movement to the corresponding valve position. In this case, the potentiometer will reutrn the mode signal as a feedback signal to indicate the instantaneous valve postion.

Figure 8:
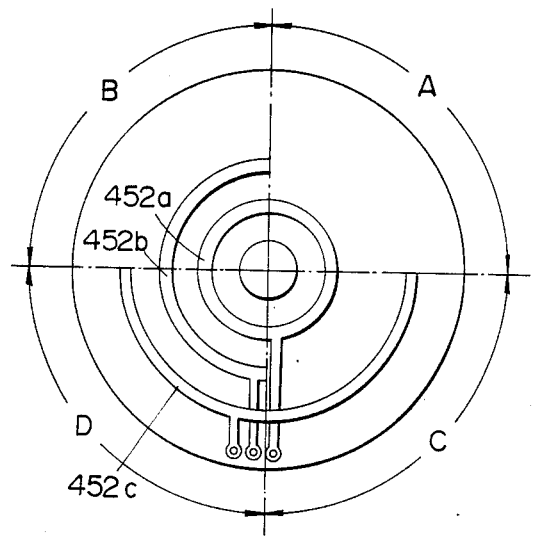
FIG. 8 is an explanatory illustration of the mode selector switch in the damping force adjusting mechanism.

It should be appreciated that the controller 500 may be operated either in automatic mode or in manual mode. In manual mode, the controller 500 is responsive to a signal from a manual selector 501 connected thereto. One example of the manual selector 501 can be seen in FIG. 8. In FIG. 8, the manual selector 501 includes a selector switch element 503 movable between HARD, INTERMEDIATE and SOFT positions.

Returning to FIG. 1, the shock absorber has a fluid reservoir chamber 232 between its inner and outer cylinders 202 and 204, which fluid reservoir chamber 232 is in communication with the lower fluid chamber 218 via the bottom fitting 205 described previously. The bottom fitting 205 may serve to produce damping force in cooperation with the piston and the damping force adjusting mechanism during bounding and rebounding motion of the vehicle. A relatively low pressure pneumatic chamber 236 is also defined between the inner and outer cylinders 202 and 204.

Figure 4A:
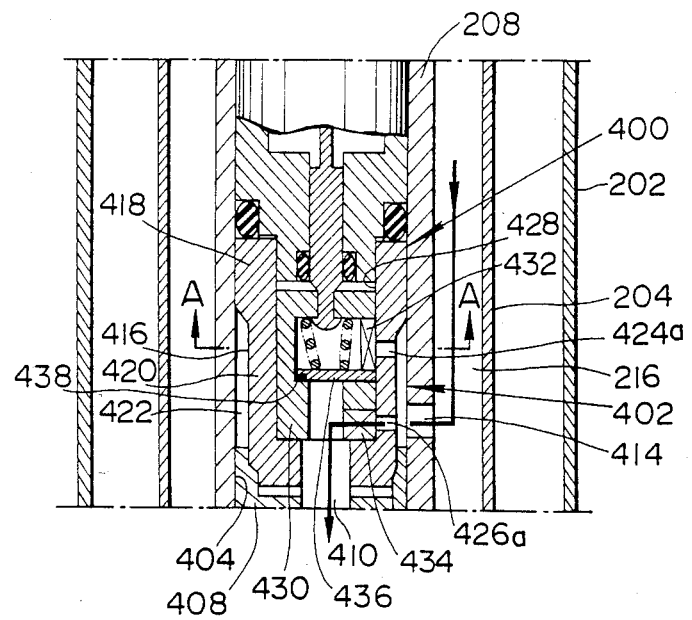
FIGS. 4a and 4b are an enlarged section of the damping force adjusting mechanism showing the state in which a mode selector is shifted to HARD mode and showing fluid flow in both the bound and during rebound motions of the vehicle.
Figure 4B:
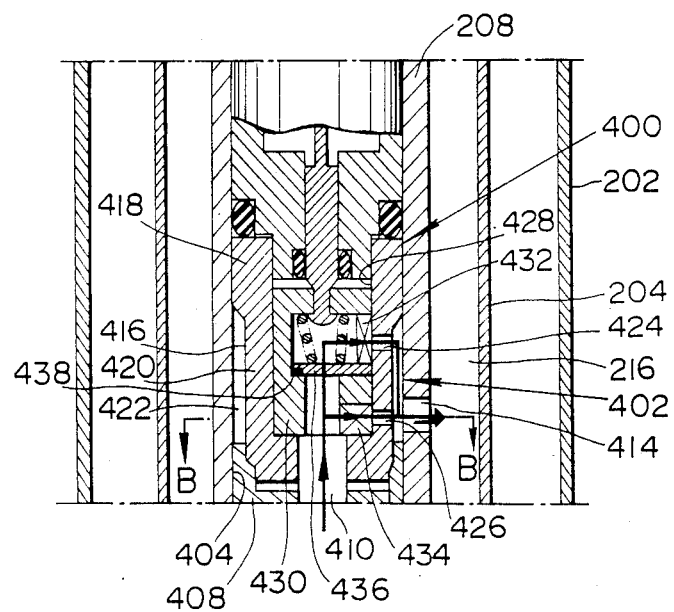

The operation of the damping force adjusting mechanism 400 will be briefly described herebelow with reference to FIGS. 4. FIGS. 4a, 4b and 5a, 5b show the case of the HARD mode. In this case, the orifice 432 of the rotary valve 430 is in alignment with the orifice 424a and the orifice 434 is in alignment with the orifice 426a. During vehicle bounding motion, i.e., in the piston compression stroke, the fluid flows as shown by arrows in FIG. 4B. On the other hand, during vehicle rebounding motion, the fluid flows from the upper fluid chamber 216 to the lower fluid chamber 218 as illustrated by arrows in FIG. 4A. Since the the first orifices 424a and 426a are the narrowest, the damping force produced in this mode is the highest among the three selectable modes.

In case of the INTERMEDIATE mode, the orifices 432 and 434 of the rotary valve member 430 are respectively in alignment with the second orifices 424b and 426b.

In case of the SOFT mode, the orifices 432 and 434 align with the third orifices 424c and 426c, respectively to cause fluid flow. Since the third orifices 424c and 426c are the widest of the three sets, as described above, the damping force created in this SOFT mode is the lowest.

Again, returning to FIG. 1, the pneumatic chamber 300 constitutes the main feature of a height control mechanism. The pneumatic chamber 300 is defined above the shock absorber by means of a rolling diaphragm 304. The lower end of the rolling diaphragm 304 is fixed to the outer periphery of the outer cylinder 204 of the shock absorber in air tight fashion by means of resilient fasteners 306. The upper end of the rolling diaphragm 304 is similarly fixed to an outer shell 308 in air-tight fashion. Though it is not clearly shown in the drawings, the outer shell 308 is adapted to be rigidly secured to the vehicle body, i.e. a strut house of the vehicle body, by means of fastener bolts. The pneumatic chamber 300 is provided with an air intake 310 through which it is connected to the pressure source 302 or the air tank 303. The internal pressure of the pneumatic chamber 300 can be adjusted by introducing pressurized air from the pressure source or the air tank or venting air from the pneumatic chamber, thereby adjusting the downward force applied to the shock absorber.

Figure 9:
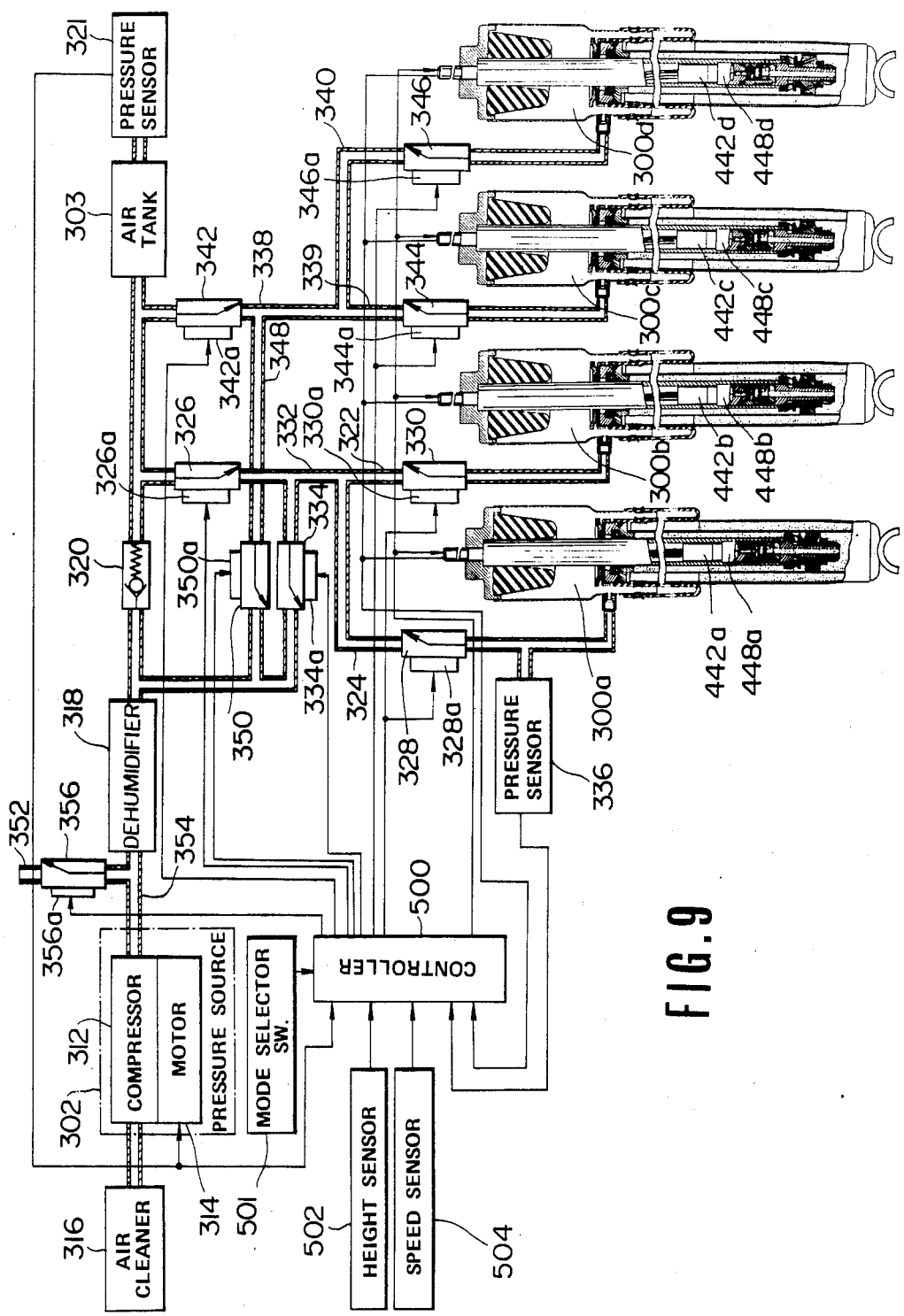
FIG. 9 is a block schematic diagram of the vehicle height control mechanism and the damping force adjusting mechanism.

FIG. 9 shows the system of the height control and damping force adjusting mechanisms according to the preferred embodiment of the invention in the form of a circuit diagram. The pressure source 302 comprising an air compressor 312 and a driver motor 314 for driving the compressor is connected to an air cleaner 316 through which it draws atmospheric air. The pressure source 302 is in turn connected to the air tank 303 via an dehumidifier 318 and a check valve 320. A pressure sensor 321 is associated with the air tank 303 to detect the internal pressure in the latter and produce a pressure-indicative signal to be fed back to the controller 500.

On the other hand, the pneumatic chambers 300a and 300b of the front strut assemblies are respectively connected to the downstream side of the check valve 320 via passages 332, 324 and 322 via electromagnetic valves 326, 328 and 330 with actuators 326a, 328a and 330a respectively. Each of the actuators 326a, 328a and 330a is connected to the controller 500 to receive control signals which control the opening and closing of the corresponding valve. The return passage 332 is also connected to the upstream side of the check valve 320 via an electromagnetic valve 334 with an actuator 334a which selectably blocks and opens this leg of the return passage. As with the actuators 326a, 328a and 330a, the actuator 334a is connected to the controller 500 to receive a control signal control its operation.

A pressure sensor 336 is connected to the passage 324 downstream of the valve 328 to detect the pressure in the pneumatic chamber 300a which is approximately the same as that in the pneumatic chamber 300b. The pressure sensor 336 produces a pressure indicative signal representative of the detected pressure and returns this signal to the controller 500.

Likewise, the pneumatic chambers 300c and 300d of the rear strut assemblies are connected to the downstream side of the check valve 320 passages 338, 339 and 340. Electromagnetic valves 342, 344 and 346 are provided in the passages 338, 339 and 340 for controlling air flow therethrough. The valves 342, 344 and 346 are respectively associated with actuators 342a, 344a and 346a which are, in turn, connected to the controller 500 to receive corresponding control signals. A return passage 348 connects the downstream side of the valve 342 to the downstream side of the valve 334. An electromagnetic valve 350 with an actuator 350a is inserted in the return passage 348, which actuator is connected to the controller 500 to receive a control signal.

The controller 500 is also connected to a vehicle height sensor 502 and a vehicle speed sensor 504. The vehicle speed sensor 504 produces a speed signal representative of detected vehicle speed. On the other hand, the vehicle height sensor 502 produces a height signal having a value indicative of the vehicle height. Although the shown embodiment has been illustrated to have a single height sensor 502, it is also possible, and may be advantageous, to provide a plurality of sensors for detecting the heights of different parts of the vehicle body. For example, a vehicle height sensor for this purpose and a sensor circuit have been disclosed in the Published European Patent Application 0 091 017, published on Oct. 12, 1983. The disclosure of the foregoing published European Patent application is hereby incorporated by reference for the sake of disclosure.

Although the shown vehicle speed sensor produces a vehicle speed signal indicative of instantaneous speed, it would also be possible to provide a vehicle speed sensor which detects whether vehicle speed is higher than a predetermined speed before producing a sensor signal. Furthermore, the vehicle height sensor may be embodied in other ways; for example, it may detect when the vehicle height is outside of a predetermined allowable range to produce an up-command or a down-command when the detected height is outside of the allowable range. Such a vehicle height detector has been disclosed in U.S. Pat. No. 4,290,044, issued on Sept. 15, 1981 to Ishikawa et al. The disclosure is also hereby incorporated by reference for the sake of disclosure.

The controller 500 is also connected in common to the step motors 442a, 442b, 442c and 442d of the damping force adjusting mechanisms of each of the shock absorbers. The controller 500 feeds a control signal to the step motors to pivot the rotary valves of all of the shock absorbers in order to adjust the damping characteristics thereof. The potentiometers 448a, 448b, 448c and 448d, respectively corresponding to the step motors 442a, 442b, 442c and 442d, are also connected to the controller to return the valve-position-indicative feedback signals. In addition, the controller 500 is connected to the mode selector switch 501 to receive a selector command depending upon the manually selected switch position.

An exhaust passage 352 is connected to a passage 354 connecting the compressor 312 and the dehumidifier 318 and one end thereof is exposed to the atmosphere. An electromagnetic valve 356 with an actuator 356a is interposed within the exhaust passage 352. The actuator 356a is connected to the controller 500 to be controlled by a control signal from the latter.

Damping force produced in response to bounding and rebounding is controlled by the controller 500. In general, a smaller damping force is produced when the air pressure in the pneumatic chamber 300 is relatively high to raise the vehicle, and on the other hand, a greater damping force will be created while air pressure in the pneumatic chamber is relatively low to lower the vehicle. The following table shows the relationship between damping force and pneumatic chamber pressure in terms of a vehicle speed:

|  | LOW SPEED | HIGH SPEED |
|---|---|---|
| VEHICLE HEIGHT | HIGH | LOW |
| AIR PRESSURE | HIGH | LOW |
| DAMPING FORCE | LOW | HIGH |

In relation to the manually selected mode, a damping force adjustment is performed so that when the mode selector switch 501 is operated to select either the SOFT or INTERMEDIATE modes, the damping force created by the shock absorber is SOFT or INTERMEDIATE respectively at vehicle speeds lower than a predetermined value, e.g., 80 km/h, and when the vehicle speed exceeds the predetermined value and the height control becomes active to lower the vehicle by a given amount, e.g. 30 mm, the shock absorber is automatically shifted to INTERMEDIATE or HARD mode respectively so that greater damping force is produced. When the HARD mode is manually selected, the mode may not changed even when the vehicle height is lowered and thus the pressure in the pneumatic chamber is decreased. It should be obvious that when the driver selects the HARD mode, the damping force produced by the shock absorber is sufficiently great, even during relatively high speed driving, to provide adequate driving stability. Therefore, it should be appreciated that, in general, the damping force adjusting mechanism is so related to the height adjusting mechanism as to perform adjustment of the damping force according to the foregoing table.

The operation of the height adjusting mechanism and the damping force adjusting mechanism will be described with reference to FIG. 9.

The manually operable mode selector switch 501 is operated by the driver to select one of the HARD, INTERMEDIATE or SOFT modes and set the damping characteristics of the shock absorbers. The mode selector switch 501 sends the selector command to the controller 500, which selector command has a value representative of the selected damper mode. The controller 500 is responsive to the selector command to output a control signal to respective step motors 442a, 442b, 442c and 442d of the strut assemblies. The step motors become active in response to the control signal to drive the rotary valves 430 to the selected valve position corresponding to the selected damping mode.

For instance, when SOFT mode is selected, the rotary valve 430 is shifted such that the orifice 342 is in alignment with the third orifice 424c of the stationary valve 416 to provide the widest cross-section of fluid flow during the piston compression stroke, i.e. bounding motion of the vehicle as shown in FIGS. 8 and 9. On the other hand, the orifice 434 of the rotary valve 430 is then in alignment with the third valve 426c of the stationary valve 416 to provide the widest cross-section of fluid flow during the piston expansion stroke, i.e., during rebound of the vehicle. By providing the widest cross-section, the damping force produced by the shock absorber in response to bounding and rebounding motion of the vehicle is minimized.

During operation of the step motors 442a, 442b, 442c and 442d for shifting the rotary valves 430 to the SOFT mode position, the potentiometers 448a, 448b, 448c and 448d continuously feed valve position indicative feedback signals to the controller 500. Based on the feedback signals from the potentiometers, the controller 500 monitors the valve position to stop the the step motors when the rotary valves are positioned as shown in FIGS. 8 and 9.

Similarly, when the INTERMEDIATE mode is selected, the controller 500 sends a control signal indicative of the selected INTERMEDIATE mode to operate the step motors 442a, 442b, 442c and 442d until all of the potentiometers 448a, 448b, 448c and 448d return feedback signals indicative of the valve INTERMEDIATE mode positions. In the valve INTERMEDIATE mode position, the orifice 432 of the rotary valve 430 is aligned with the second orifice 424b of the stationary valve 416 to provide a cross-sectional area intermediate those of the the SOFT and HARD modes, for allowing fluid flow during the piston compression stroke. At the same time, the orifice 434 is aligned with the second orifice 426b of the stationary valve to provide an intermediate cross-sectional path are for the piston expansion stroke.

When the HARD mode is selected, the rotary valve 430 is shifted to the position shown in FIGS. 4a, 4b and 5a, 5b. In this valve position, the orifice 432 is in communication with the first orifice 424a of the stationary valve member 416 to restrict fluid flow with the narrowest cross-section of fluid flow during bounding motion of the vehicle. At the same time, the orifice 434 is in communication with the first orifice 426a to restrict fluid flow during rebound to the minimum with the narrowest cross-sectional area.

In addition, the controller 500 is active in response to the pressure indicative signals from the pressure sensors 321 and 336, the vehicle height-indicative signal from the vehicle height sensor 502 and the vehicle speed-indicative signal from the vehicle speed sensor 504. The pressure-indicative signal from the pressure sensor 321 is indicative of the air pressure in the air tank 303. The controller 500 compares the valve of the signal from the pressure sensor 321 with a reference value to judge whether the air pressure accumulated in the air tank is sufficiently high to operate the height control mechanism. When the air pressure in the air tank 303 is high enough to operate the height control mechanism and thus the signal value of the sensor signal of the pressure sensor 321 is greater than the reference value, then controller 500 sends a control signal to the motor 314 to hold the latter inoperative. At the same time, the control signal is also sent to the actuator 356a of the electromagnetic valve 356 to connect the compressor 312 to the atmosphere to exhaust excessive pressure in the passage 354 as well as in the compressor. When the signal value of the pressure sensor 321 is smaller than the reference value, the controller sends control signals to the motor to energize the motor 314 and to close the electromagnetic valve 356. Thus, compressor 312 supplies pressurized air to the air tank 303 via the dehumidifier 318 and the check valve 320. The controller 500 maintains this state until the pressure-indicative signal from the pressure sensor 321 again reaches a value above the reference value.

The controller 500 is responsive to the vehicle height-indicative signal from the vehicle height sensor 502. When the height-indicative signal indicates that the vehicle is lower than a given lower height limit, then the controller sends control signals to the actuators 326a, 342a, 328a, 330a, 344a and 346a to open the corresponding valves 326, 342, 328, 330, 344 and 346. As a result, the pressurized air in the air tank 303 or from the compressor 312 is introduced into the pneumatic chambers 300a, 300b, 300c and 300d of the strut assemblies to increase the pressure in the pneumatic chambers. Due to the increase in the pneumatic pressure in the pneumatic chambers, the vehicle is raised to within the given allowable range. At this time, the controller 500 also sends control signals to the actuators 344a and 350a to close or shut off the valves 334 and 350 and thus block air flow through the return passages 332 and 348.

The pressure sensor 336 is active during the foregoing height control operation to continuously feed the pressure-indicative signal to the controller 500. The controller 500 is responsive to the pressure-indicative signal from the pressure sensor 336 to shut the valves 326 and 342 when the pressure in the pneumatic chamber reaches a predetermined maximum pressure.

When the vehicle is higher than the predetermined upper limit as detected by the vehicle height sensor 502, then the controller 500 sends control signals to the actuators 334a, 350a, 328a, 330a, 344a and 346a to open the valves 334, 350, 328, 330, 344 and 346 and allow the pressure in the pneumatic chambers 300a, 300b, 300c and 300d to be vented through the return passages 332 and 348. At the same time, the controller 500 sends control signals to the actuators 326a and 342a to hold the valves 326 and 342 closed. The controller 500 continues the vehicle lowering operation until the vehicle height-indicative signal indicates the vehicle height within the allowable range.

During the foregoing up- and down-operations for adjusting the vehicle height to within the allowable range, the damping force adjusting mechanism is controlled by the controller to the damper mode according to the foregoing table. Specifically, when the pressure in the pneumatic chamber is increased, the damper mode is shifted to the next-softer mode in order to decrease the damping force generated by the shock absorber. On the other hand, when the air pressure in the pneumatic chamber is decreased, the damping force is increased by shifting to the next-harder mode, if possible.

For better understanding, further explanation is given herebelow by way of an example, in which four passengers ride the vehicle for a certain distance and then some of the passages get out of the vehicle and thus a reduced number of people remain in the vehicle.

When all four passengers get in the vehicle, the vehicle suspension is subjected to an increased load which lowers the vehicle to a certain level below the lower limit. The vehicle height sensor 502 feeds the signal indicative of the vehicle height lower than the lower limit. Then, the controller 500 sends control signals to operate the height control system so as to increase the air pressure in the pneumatic chambers and thus raise the vehicle body. At this time, due to increase in the air pressure in the pneumatic chambers, the vehicle suspension is apt to become too rigid, resulting in a rough ride feeling. To correct the driving comfort, the damping force is reduced by shifting the damper mode so as to soften the shock absorber.

Under these conditions, when the vehicle moves at a speed higher than the predetermined speed, e.g. 80 km/h, then the controller 500 is responsive to the vehicle speed sensor signal indicative of the vehicle speed to feed control signals which lower the vehicle by the predetermined amount, e.g. 30 mm, for better aerodynamics and driving stability. In order to lower the vehicle, the air pressure in the pressure chamber must be reduced. In response to this reduction in the air pressure in the pneumatic chamber, the controller 500 sends a control signal to the step motors to shift the damper mode so as to harden the shock absorbers.

When the vehicle decelerates to a speed lower than the predetermined speed, the vehicle height can be returned to the normal level. This is done by increasing the air pressure in the pneumatic chambers. In response to the increase in the pressure in the pneumatic chambers, the damping force adjusting mechanism becomes active to soften the shock absorbes.

When some of the passengers get out of the vehicle, and the load applied to the vehicle is thus reduced, the vehicle height goes up beyond the upper limit due to the relatively high pressure in the pneumatic chambers. The height sensor detects that the vehicle is higher than the upper limit and sends a signal indicative thereof to the controller. The controller 500 is responsive to the signal from the height sensor 502 to actuate the electromagnetic valves to exhaust pressurized air from the pneumatic chambers 300a, 300b, 300c and 300d and so lower the vehicle below the upper limit. The controller 500 is also responsive to this reduction in the air pressure in the pneumatic chambers to operate the damping force adjusting mechanism to harden the shock absorbers.

It should be appreciated that the vehicle height control mechanism may also act as a level regulator for the vehicle to keep the vehicle level. Such level regulation is generally performed by adjusting pressure in the pneumatic chambers 300c and 300d of the rear strut assemblies. To perform this leveling operation, the height of the rear portion of the vehicle is detected by the vehicle height sensor to increase and decrease the air pressure in the pneumatic chambers 300c and 300d depending upon the height of the rear portion. For example, when relatively heavy luggage is put into the rear luggage space or the rear seat is full of passengers, the rear portion of the vehicle is apt to be lowered in relation to the front protion. This degrades driving stability and cants the axis of the headlights upwards. Under these conditions, the leveling operation may be performed to shift the rear portion of the vehicle upwards in order to maintain the vehicle level within an allowable range. In addition, more precise control may be achieved by controlling the pressure within each of the pneumatic chambers and the damping force of each of the shock absorbers in relation to the pressure in the corresponding pneumatic chamber.

As set forth above, according to the present invention, vehicle height control can be performed without degrading driving comfort and driving stability and thus fulfills the objects and advantages sought therefor.

While a specific embodiment has been disclosed hereabove in order to facilitate detailed explanation of the invention, the invention should be understood to include all possible modifications and embodiments covered in the appended claims. For example, the shock absorber may be constructed in other ways while still incorporating a damping force adjusting mechanism performing substantially the same adjustment as set forth above. Furthermore, mode selection in the damping force adjusting mechanism need not necessarily be three-way.

What is claimed is:

1. An automotive suspension system including a vehicle height control system comprising:
    a suspension strut suspending a suspension member from a vehicle body and including a shock absorber which produces a damping force in response to vertical motion of a vehicle body with respect to the suspension member;
    a vehicle height sensor for detecting the vertical position of the vehicle body with respect to the suspension member and producing a height-indicative signal having a value directly representative thereof;
    a damping force adjusting mechanism associated with said shock absorber for adjusting the magnitude of damping force by adjusting the cross-sectional area of a flow-restriction orifice in the shock abosrber, said damping force adjusting mechanism including an electrical actuator for adjusting said cross-sectional area;
    a vehicle height-adjusting mechanism associated with said shock absorber for controlling a height-adjusting force applied to said shock abosrber, which force is effective to separate said vehicle body from said suspension member; and
    a controller associated with said damping force adjusting mechanism and said vehicle height control mechanism for sending control signals thereto, said controller including means responsive to said height-indicative signal to control said height-adjusting mechanism to increase said height-adjusting force applied between said vehicle body and said suspension member to raise the vehicle body when the value of said height-indicative signal is smaller than a given threshold, means responsive to increases in said height-adjusting force to operate said damping force adjusting mechanism to increase said cross-sectional area and thus reduce the damping force, means responsive to height indicative signals having a value greater than a given threshold to control said height-adjusting mechanism to decrease said height-adjusting force to lower the vehicle body, and means responsive to decreases in said height-adjusting force to reduce said cross-sectional area to increase the damping force.

2. The suspension system as set forth in claim 1 which further comprises a vehicle speed sensor adapted to produce a vehicle speed-indicative signal having a value indicative of the vehicle speed, and said controller includes means responsive to vehicle speed indicative signals having a value greater than a predetermined value to operate said vehicle height control mechanism to decrease said heightadjusting force and to operate said damping force adjusting mechanism to increase the damping force.

3. The suspension system as set forth in claim 2 wherein said vehicle height control mechanism comprises a member defining a pneumatic chamber between said vehicle body and said suspension member, a circuit including a pressure source for introducing and exhausting pressurized fluid into and out of said pneumatic chamber for adjusting said height-adjusting force, and a valve means operative in response to said height control signal to control introduction and exhausting of the pressurized fluid.

4. The suspension system as set forth in claim 3 wherein said vehicle height control mechanism further comprises a pneumatic pressure reservoir for accumulating pneumatic pressure and said valve means includes a selector valve for selectively connecting said pneumatic chamber to one of said pressure source and said pneumatic pressure reservoir.

5. The suspension system as set forth in claim 4 wherein said vehicle height control mechanism further comprises a first pressure sensor for detecting the pneumatic pressure in said pneumatic chamber and sending a first pressure-indicative signal to said controller, and said controller includes means responsive to said first pressure-indicative signal to control the pressure in the pneumatic chamber to be below a predetermined pressure.

6. The suspension system as set forth in claim 5 wherein said vehicle height control mechanism further comprises a second pressure sensor for detecting the pneumatic pressure in said pneumatic pressure reservoir and sending a second pressure-indicative signal to said controller, and said cotnroller includes means responsive to said second pressure-indicative signal to select one of said pressure source and said pneumatic pressure reservoir to communicate with said pneumatic chamber.

7. The suspension system as set forth in claim 3 wherein said damping force adjusting mechanism comprises means for defining a working fluid passage within said shock absorber, a cross-sectional area adjusting valve disposed in said fluid passage to form said flow-restriction orifice, which adjusting valve is movable in a first direction to increase said cross-sectional area and in a second direction to decrease said cross-sectional area, and an actuator associated with said adjusting valve and responsive to a damping force adjusting signal from said controller to operate said adjusting valve so as to increase and decrease said cross-sectional area depending upon the value of said damping force adjusting signal.

8. The suspension system as set forth in claim 7 wherein said damping force adjusting mechanism further comprises a valve position detector associated with said actuator to produce a valve position-indicative signal to be fed back to said controller.

9. The suspension system as set forth in claim 4 wherein said damping force adjusting mechanism comprises means defining a fluid passage in said shock absorber for communication between upper and lower fluid chambers defined therein, a stationary valve stationarily disposed within said fluid passage and having a plurality of flow-restriction orifices having mutually distinct cross-sectional areas, a rotary valve rotatably disposed within said stationary valve and having a axial fluid flow passage and a radial path opposing one of said flow-restriction orifices, and an actuator responsive to a damping force adjusting signal from said controller to rotate said rotary valve to establish fluid communication between said radial path and the selected one of said flow-restriction orifices in order to adjust said cross-sectional area.

10. A method of coordinating automatic vehicle height control and manual shock absorber damping forces selection in an automotive vehicle, comprising the steps of:
increasing the damping force of the shock absorber or shock absorbers in response to decreases in the vehicle height mediated by an automatic vehicle height control system; and
decreasing the damping force of the shock absorber or shock absorber in response to increases in the vehicle height mediated by the automatic vehicle height control system.

11. The method of claim 10 wherein both vehicle height and shock absorber damping force are adjustable in a step-wise manner and wherein for every step of increase or decrease in vehicle height, the shock absorber damping force is respectively decreased or increased by one step.

12. An automotive suspension system including a vehicle height control system comprising:
a suspension strut suspending a suspension member from a vehicle body and including a shock absorber which produces a damping force in response to vertical motion of a vehicle body with respect to the suspension member;
a vehicle height sensor for detecting the vertical position of the vehicle body with respect to the suspension member and producing a height-indicative signal having a value directly representative thereof;
a damping force adjusting mechanism associated with said shock absorber for adjusting the magnitude of damping force in a step-wise manner;
a vehicle height-adjusting mechanism associated with said shock absorber for controlling a height-adjusting force applied to said shock absorber in a step-wise manner, which force is effective to separate said vehicle body from said suspension member; and
a controller associated with said damping force adjusting mechanism and said vehicle height control mechanism for sending control signals thereto, said controller including means responsive to said height-indicative signal to control said height-adjusting mechanism to increase said height-adjusting force applied between said vehicle body and said suspension member to raise the vehicle body when the value of said height-indicative signal is smaller than a given threshold, means responsive to a step of increase in said height-adjusting force to operate said damping force adjusting mechanism to reduce the damping force by one step, means responsive to height-indicative signals having a value greater than a given threshold to control said height-adjusting mechanism to decrease said height-adjusting force to lower the vehicle body, and means responsive to a step of decrease in said height-adjusting force to increase the damping force by one step.

13. An automotive suspension system according to claim 2 wherein said damping force adjusting mechanism is manually settable in one of several modes, including soft, intermediate or stiff, to establish the normal condition of the suspension system.

* * * * *